United States Patent Office 3,509,683
Patented May 5, 1970

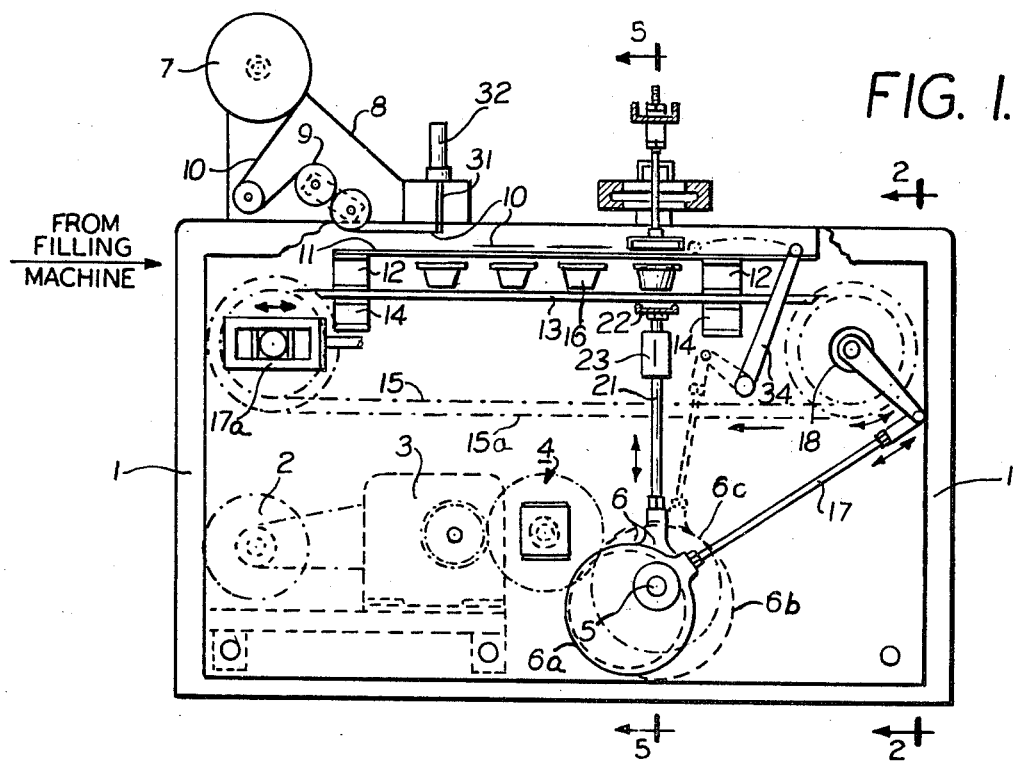
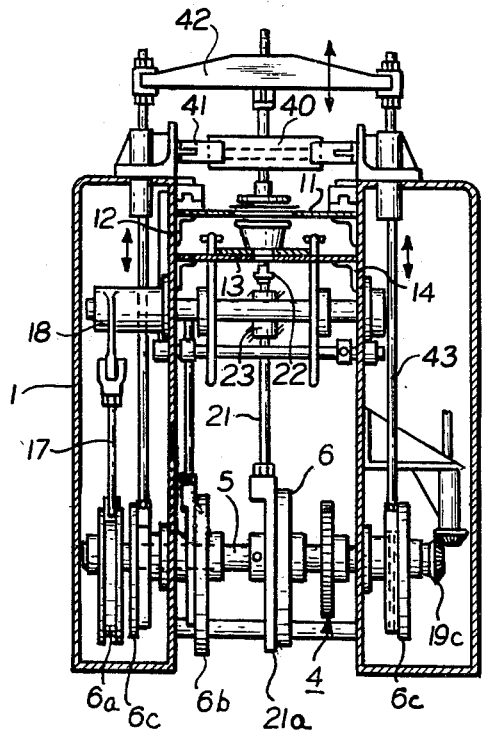
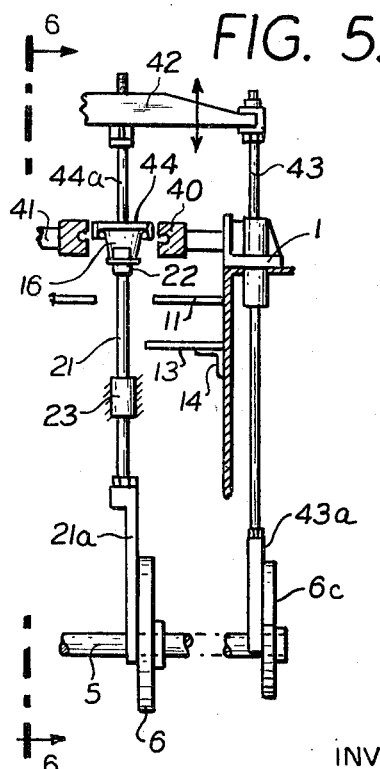

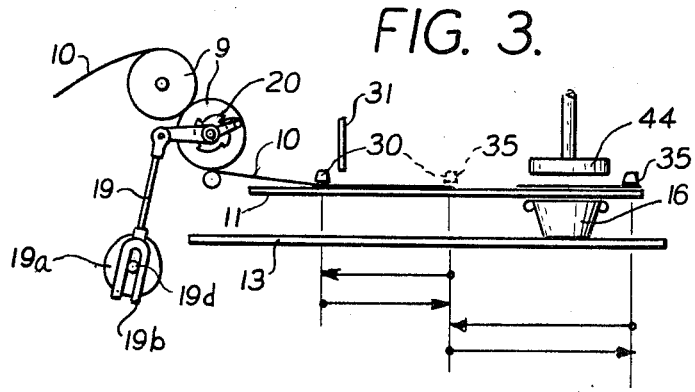
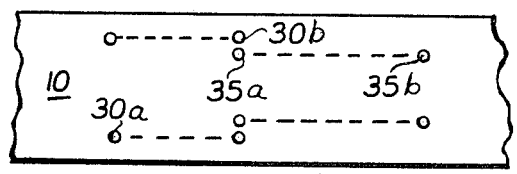
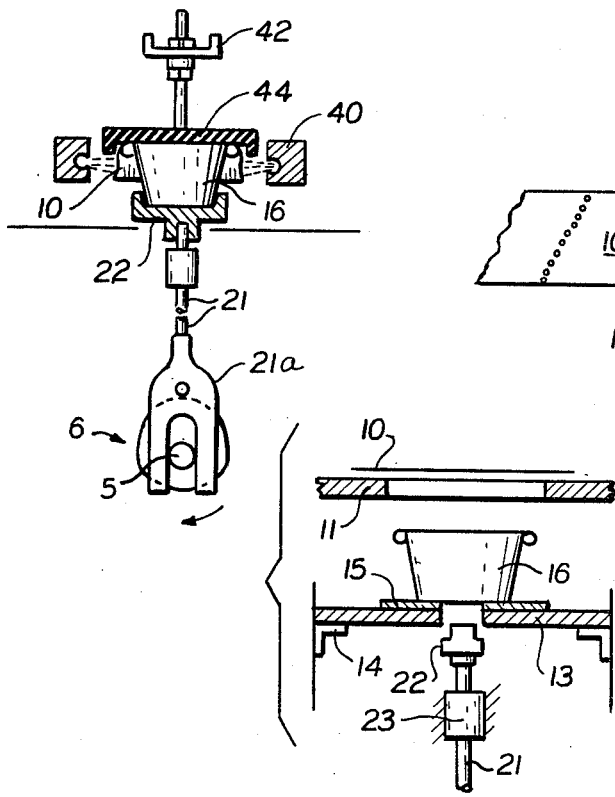
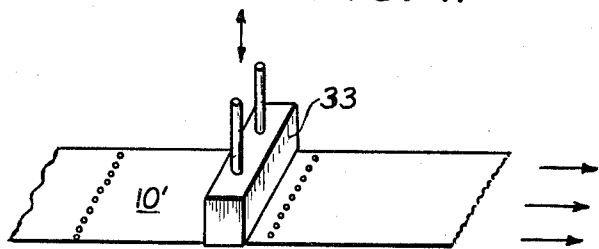
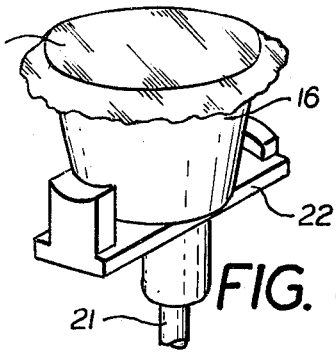

3,509,683
APPARATUS AND METHOD FOR SIMULTANE-OUSLY MAKING CLOSURES AND SEALING CONTAINERS
Martin M. Sternau, Flushing, N.Y., assignor to W. R. Grace & Co., Duncan, S.C., a corporation of Connecticut
Filed July 20, 1967, Ser. No. 654,761
Int. Cl. B65b 7/28
U.S. Cl. 53—42                                                    7 Claims

ABSTRACT OF THE DISCLOSURE

This invention pertains to an apparatus, and to a method, for simultaneously capping and sealing containers, employing the method of selective or controlled shrinkage of heat shrinkable, oriented plastic film or sheet, by placing the film or sheet over the mouth of a filled container, the film being larger than the mouth of the container, and applying heat, selectively, first only to the extended edge of the film whereby to cause the edge of the film to shrink quickly, and second to the remaining portion of the film so as to form a closure hermetically sealing the container.

---

This invention relates to a method and apparatus for simultaneously making closures and sealing containers. It is based on the following principle: When a piece of heat shrinkable, oriented plastic film is subjected to heat of any type, it will shrink and shrivel into an irregular ball-shaped configuration due to its inherent oriented characteristics. However, when the central or interior portion of the film is shielded or otherwise insulated from the direct or indirect influence of heat while the perimeter or rim area is subjected to heat, only the rim area of the film will shrink and will be reduced, thereby being curled and producing a cap-shaped or cup-shaped configuration.

In the presence of a container, tub or cup, the film being larger than the mouth of the container and having been placed upon the mouth of the container, and retained thereon and shielded in the area of the mouth of the container, only the exposed edges or rim will shrink causing the edges of the film to curl. The edges will continue to shrink until the curler edge portion of the film is physically restrained by the rim of the container, whereby to form a cap-shaped closure or cover with an expansible or elastic bead or band upon the container. This closure will tightly conform to the mouth of the container regardless of its shape since the film will always assume the configuration of the container mouth, be it round, oval, rectangular, or any other shape. If heat is thereafter applier to the center portion of the film which previously had been shielded, that is, the portion within the area defined by the rim of the container, this central area will then shrink and become tight whereby the cap or cover originally formed will form a still tighter hermetical seal around the container.

In view of the above statements, it follows that one of the objects of this invention is to provide an apparatus, and a method, for performing selective shrinkage of a draped or unformed piece of heat shrinkable, oriented plastic film or sheet to form a closure directly upon a container and simultaneously seal the container.

Another of the objects of this invention is to provide an apparatus, machine, or device for performing the method of selective shrinkage of heat shrinkable, oriented plastic film to form a closure directly upon a container and simultaneously to seal the container, i.e., the forming and sealing occurring at the identical instant, said apparatus having means for cutting a piece of film, means for placing said film on top of the mouth of a filled container, means for applying heat, selectively, to the rim area of the film, means for shielding the center portion of the film while heat is applied to its peripheral area, means for thereafter applying heat to the center portion of the film, and transporting means for the filled container before and after sealing.

A further object of this invention is to provide a closure formed by a machine, and a method, using a transparent (preferably), heat shrinkable, oriented plastic film or sheet, which film is thin, fragile, flexible, limp, drapable (preferably), unformed plastic of any type. Heat shrinkable films that are normally less than .002" thick and capable of large shrinkage in all directions parallel to the film surfaces are particularly applicable. Actually films in the range of .0002" (20 gauge) to .0008" (80 gauge) are generally satisfactory and may be used. The thickness of the film, of course, will depend somewhat upon the area to be covered. However, it is within the scope of my invention to use any type film that is shrinkable in only one direction as well as in two directions (e.g. an oriented film of the so-called tensilized or cross-tensilized type) which could be used on containers of any particular form, such as on a circular or rectangular container.

Typical examples of certain films which could be used are oriented films of rubber hydrochloride (oriented * "Pliofilm" (1), such as "Snug-Pak" (2)) or of vinylidene chloride (oriented "Saran" (3), "Cryovac" (4)), biaxially oriented irradiated polyethylene, biaxially oriented polypropylene, heat shrinkable nylon, heat shrinkable polyester ("Mylar" (5)), etc., and including any high shrink energy materials or polymers, which are heat shrinkable by reason of their oriented internal structure commonly induced by stretching the same unidirectionally or multidirectionally while heated or supercooled. Obviously, the "orienting" of such films may be done by mechanical, pneumatic, or other physical methods of expanding or sretching the films, or by chemical, irradiating or other means of crosslinking the molecular arrangement.

The selection of films of suitable shrinkability, suitable shrinkage temperature, and suitable strength will be dictated primarily by the nature of the container or contents, and the temperature to which the localized area may be heated when the sealing of the closure to the container is effected, and such selection may be readily made. For a more extended disclosure of the type film and conditions used herein, reference is made to the above prior heat shrinkable film art.

With the foregoing and other objects in view as will appear from a reading of the following specification and claims, the invention resides in the novel arrangement and combination of parts and in the details of construction and process of manufacture herein described and claimed, it being understood that changes in the precise embodiment of the invention may be made within the scope of what is claimed without departing from the spirit of the invention. It will be further understood that the invention is susceptible of embodiment in many and various forms, some of which are illustrated in the accompanying drawing, and that the structural details of the apparatus or particular steps of the method herein set forth may be varied to suit particular purposes and still remain within the inventive concept.

Referring broadly to the figures:

FIG. 1 is a diagrammatic side elevation of the complete capping and sealing apparatus.

FIG. 2 is a cross-sectional view taken on the line 2—2 of FIG. 1, while FIG. 2-A is an enlarged view showing the container elevating area.

---

\* See end of specification for above registered trademark owners).

FIG. 3 is a diagrammatic view of the film positioning device showing the motion of the pick-up fingers or suction cups for transporting the film on top of the film shelf, with the conventional actuating means omitted for clarity.

FIG. 4 is substantially a plan view of FIG. 3 illustrating schematically the movement of the pick-up fingers, but also with actuating elements omitted.

FIG. 5 is a cross-sectional view taken on the line 5—5 generally illustrating the container elevating and film heating means.

FIG. 6 is an enlarged detail view of a preferred fluid heat sealing means taken on the line 6—6 of FIG. 5, and FIG. 6-A illustrates the details of the container platform, the container being reduced in size to better illustrate the configuration of the platform.

FIG. 7 illustrates a further modified form wherein a roll of pre-perforated film is used with a clamping or holding bar for tearing the individual cover strips at a film severing station.

Referring in detail to FIG. 1, numeral 1 indicates the housing or frame for the apparatus containing motor 2, reduction gears 3, a train of gears generally indicated by 4, and a power shaft 5 on which are mounted a series of cams and eccentrics indicated by numerals 6, 6a, 6b, 6c.

As illustrated in FIG. 1, a roll of film 7 is mounted on the housing 1 by support 8 which also holds feed rollers 9 through which film 10 passes as it is moved (see also FIGS. 3 and 4) over the upper film shelf 11 supported by brackets 12. A lower container shelf 13, positioned by lower brackets 14, carries an intermittently movable belt 15, with spaced holes therein, to move the filled containers towards the capping station by a stepwise movement. This occurs after the containers have been brought by conventional means from the filling machine to the movable belt 15. Obviously, the holes in the belt, and belt shelf must be large enough to permit the passage of elongated platform 22, but small enough so that the bottom of the container will not fall through (see FIG. 6A). The tension in the container carrying belt 15 may be adjusted by standard regulating and tensioning means 17a. Instead of using a single belt with spaced apertures, two narrow, spaced apart, belts may be used on belt shelf 13. Here again the spacing must be small enough to prevent the bottom of the containers from falling through, but large enough to permit free passage of platform 22.

Power shaft 5, through an eccentric 6-a (see FIG. 1) reciprocates rod 17, actuating a ratchet 18, to move intermittently the container belt or cup transfer belt 15 in a forward direction. If desired, a positive chain drive 15a may be used between the belt power drum, operated through rod 17 and ratchet 18, and the belt idler drum. Similarly, rod 19 (see FIG. 3) actuated by cam 19a and cam fork 19b moves ratchet 20 on feed rolls 9 to advance the film 10. Cam 19a is driven by bevel gear drive 19c, shown in FIG. 2.

Timed with this movement is the reciprocating movement of elevator shaft 21 through stationary bearing 23 carrying the narrow elongated platform 22 with its base hub and oppositely arranged upstanding ears preferably of equal size. Movement of the platform 22 is produced by cam 6 and cam fork 21a. The platform supports a container to be capped. The diameter, or the length, of the bottom of a container, must be larger than a portion of the preferably rectangular aperture in the container transfer belt, as can be seen in FIGS. 2 and 2-A, while both the longer and narrower dimensions of the preferably rectangular platform must be smaller than the belt aperture (or space between two separate belts) so as to freely pass there-through when the container is lifted to the sealing area.

FILM ADVANCING MECHANISM

Referring specifically to FIGS. 3 and 4, and also generally to FIG. 1, as mentioned above cam 19a on shaft 19d, actuated by bevel gear-drive 19c, operates rod 19 and ratchet 20 and, with the assistance of pick-up grippers, clamps, fingers, or suction cups 30, advances film strip 10 beyond severing means 31 housed in enclosure 32 (FIG. 1). The severing means may be any conventional means, such as, a knife, guillotine, heated wire, etc. Alternatively, as shown in FIG. 7, a perforated film strip 10, and a reciprocating clamp 33, for example, may be used to restrain the strip, so that the tension caused by the grippers will cause the strip to separate into suitable sized cover pieces or blanks.

Several types of positioning mechanisms may be employed, but I prefer a conventional double, superimposed, oppositely operating rack and pinion arrangement (not shown) which would be operated by cam 6 and bell crank 34 connected thereto. One of the racks, for example, could move the pick-up grippers, or suction cups in a forward direction, while the other rack, preferably operated by the same pinion or gear, would be returning its fingers to their rear position.

For example, grippers or clamps 30 will pick up the end of the continuous film 10 and pull the entire film strip from the roll a sufficient distance, i.e., from point 30a to point 30b (see FIGS. 3 and 4). Cutting means 31 then will sever the strip. At approximately the time grippers 30 are releasing the cut blank, grippers 35 will grab the blank. While grippers 30 are returning to their home position at 30a, grippers 35 will return, with the film blank, from position 35a to its home position 35b.

If desired, a modified arrangement could be used. Grippers 30 could be dispensed with and the sealing station moved closer to the cutting means 31. The cycle would be as follows: Gripping or clamping fingers 35 would grab the film strip at the severing point and would pull it out the necessary distance to form a film blank or film section and at the same time place it over container to be covered. The cutter would then sever the strip, and grips 35 would return again to the severing point to pull out more film strip. Clearly, two or more sets of grippers could be used so that as one set was pulling the strip toward the covering and sealing area, the other set would be returning to the cutting area to grab the strip immediately after being cut and the sealing operation moved the previous section away.

HEATING, FORMING AND SEALING MEANS

After the cut film is positioned above the container, elevator shaft 21 and platform 22, actuated by cam 6 and cam fork 21a will rise through the apertures in shelf 13 and belt 15 to pickup and raise container 16, and subsequently film piece 10.

A circular heating ring 40, supplied preferably with fluid heat, such as hot air or steam, is preferably fixedly mounted on the housing 1 by supports 41.

A crosshead 42, attached to reciprocating rods 43 and cam fork 43a carries, from a depending central rod 44a, a shield 44 of insulating material, such as, asbestos, hard rubber, etc. As the container is raised by platform 22, it picks up a section of plastic film. In the meantime the shield 44, timed by cam 6c, descends past the heating ring (which preferably would be temporarily inoperative) to engage the rising container. Thus the container and film travel up to the end of the stroke, being positioned within the heating ring. Disc 44 shields the central area of the film while leaving the edges of the film exposed to blasts of hot air or steam or to heat caused by high frequency electricity, electrical resistance, infra red heat, or other heat supplied to the ring or directly to the film in conventional manner.

After the skirt edge of the cover has been momentarily exposed to the heat from any source and shrunk onto the container, the shield 44 may be raised and as the top of the covered container is lowered to be level with the heated blast, the central area of the film then will be shrunk so as to make a tighter and hence better seal. The sealed container is then lowered to be level with the heated blast, the central area of the film then will be shrunk so as to make a tighter and hence better seal. The sealed container is then lowered to the container belt and is advanced by the container belt, to be moved from the capping machine by conventional means to a packing and storing area.

For simplicity and ease of illustration, my device has been illustrated with a single sealing unit, i.e., sealing one container at a time. However, it is readily apparent that a series of these individual sealing units can be set up side by side, all within a single housing 1, and all operated from the same power shaft 5. The only limiting factor would be how wide the machine could reasonably be constructed, and this could conceivably seal 1 to 50 or more containers at one time.

Obviously, an oven heated by infrared heat lamps or any other heat would be within the spirit of my invention. The sole consideration is that a shield tightly pressed against the container rim must be provided before the film-covered container enters the heated area so that the skirt of the film will be selectively shrunk first to provide a tight, but elastic and flexible, edge bead around the container and removably retain the cover on the container. If the shield is not pressed tightly against the container rim, to thereby shield and restrain the entire area within the mouth of the container when the film edges are being heated, no seal will result. Hence, insulating shielding element 44, which may be flat or with short depending sides, functions as a clamp as well as a shield, and may be properly referred to as a restraining or retaining shield or restraining plate. If desired, obviously, only the skirt need be exposed to heat and shrunk. In this case, the central area will not be as tight as if it too were exposed directly to heat.

REGISTERED TRADEMARKS MENTIONED IN COLUMN 3

(1) "Pliofilm" of Goodyear Tire & Rubber Co.
(2) "Snug-Pak" of Tee-Pak, Inc.
(3) "Saran" Wrap of Dow Chemical Co.
(4) "Cryovac" of W. R. Grace & Co.
(5) "Mylar" of E. I. du Pont & Co.

The embodiments of the invention in which an exclusive property or privilege is claimed are defined as follows:

1. An apparatus for simultaneously making closures and sealing containers with heat shrinkable film comprising:
   (a) a container transfer conveyor comprising:
      (i) a stationary shelf having an opening therein smaller than the bottom of a container; and,
      (ii) a movable belt means having at least one space therein co-operating with said opening;
   (b) a film transfer conveyor arranged above said container conveyor;
   (c) a heating means;
   (d) an elevating mechanism normally positioned beneath the container and adapted to rise carrying the container and film to the heating means;
   (e) a shielding member over the central area of the film while adjacent the heating means whereby the central area of the film will be protected from the heat as long as the shield is positioned over the central area of the film; and,
   (f) means for removing said shielding member prior to the removal of the container from the heating means.

2. An apparatus as set forth in claim 1 wherein the film conveyor mechanism comprises a shelf having an aperture therein cooperating with the opening in said container shelf whereby a section of film positioned thereover will be picked up by the rising container.

3. An apparatus as set forth in claim 2 and a severing means, said film conveying mechanism comprising two sets of fasteners normally at opposite ends of said shelf, one set of fasteners adapted to move the film from storage means beyond a severing means, said severing means adjacent said storage means for cutting the film strip into sections, and a second set of fasteners to drag the film strip and to position it over the container while the first set of fasteners returns to its initial position adjacent the severing means.

4. An apparatus as set forth in claim 3 wherein the container conveyor mechanism comprises a series of cams, levers, and a ratchet arrangement whereby to provide a step-wise interrupted motion to said containers, and a cam, a crank and a ratchet arrangement connected to and operating through said film storage means to provide an interrupted, step-wise advance for the film.

5. An apparatus as set forth in claim 4, and a power shaft, a series of cams mounted on said shaft, and said elevating mechanism comprising a rod at one end operatively connected to one of said cams, a platform of irregular shape, its length being longer than the bottom of the container to be raised and its width being shorter than the container to be raised so that it will pass through the opening in the shelf and belt means, being attached to the other end of said rod, and a stationary bearing intermediate the ends of said rod, said power means operatively connected to both the container conveying mechanism and the film conveying mechanism.

6. A method for simultaneously making a closure and sealing containers using heat shrinkable, oriented, thin, plastic film comprising the steps of:
   (a) cutting the film into sections;
   (b) positioning the containers on spaced apart dual belt means on an apertured shelf;
   (c) superimposing the film sections over the containers;
   (d) raising the container and superimposed film to engage a shielding element;
   (e) moving a platform through the aperture in the shelf and the space between the dual belts to raise the container, the film, and the shield into a heating area, said movement being interrupted; and, subsequently,
   (f) after the peripheral area of the film has been shrunk tightly against the rim of the container, lowering only the container while keeping the shield at the same level, thereby permitting the heat to impinge upon the central area of the plastic film to shrink this central area and make a tightened seal at the rim of the container.

7. An apparatus for forming a closure and simultaneously sealing a filled container using shrinkable film comprising:
   (a) means for feeding heat shrinkable oriented film from a source to a cut-off station;
   (b) cut-off means for cutting said film at predetermined intervals;
   (c) transfer means to move the cut-off film to a sealing station;
   (d) elevating means for elevating container and film at the sealing station;
   (e) container transfer means comprising
      (i) a stationary shelf having an aperture slightly smaller than the bottom of the container, said aperture position directly over said elevating means and
      (ii) belt means having apertures throughout its length and of approximately the same size as the aperture in said shelf whereby the container will not pass through either of the apertures while permitting the elevating means to pass therethrough and lift the container and the film into a sealing area comprising;
         (1) film restraining means for restraining and shielding said film on top of said container;
         (2) heating means for selectively shrinking the edge of said film while said film is held by said restraining and shielding means to thereby make a tight seal; and,
         (3) means for removing the restraining and shielding means whereby the formerly protected film on the top of the container will be exposed to heating means and this latter area will be shrunk to make the edge seal tighter.

References Cited

UNITED STATES PATENTS

| | | | |
|---|---|---|---|
| 3,354,614 | 11/1967 | St. Clair et al. | 53—329 |
| 2,976,655 | 3/1961 | Dreyfus et al. | 53—329 |
| 3,014,320 | 12/1961 | Harrison | 53—42 |
| 3,262,245 | 7/1966 | Snow | 53—184 |
| 3,354,604 | 11/1967 | Amberg et al. | 53—42 |
| 3,017,729 | 1/1962 | Cheeley | 53—27 |
| 3,197,940 | 8/1965 | Spangler | 53—329 |

THERON E. CONDON, Primary Examiner
HORACE M. CULVER, Assistant Examiner.

U.S. Cl. X.R.

53—184, 297

UNITED STATES PATENT OFFICE
CERTIFICATE OF CORRECTION

PATENT NO. 3,509,683                                    DATED  MAY 5, 1970

Martin Sternau

It is certified that error appears in the above-identified patent and that Said Letters Patent are hereby corrected as shown below:

In the specification, Column 1, Line 44, "curler" should read --curled--. Column 4, Line 14, "cam 6" should read --cam 6b--. Column 4, Lines 74 and 75, "The sealed container is then lowered to be level with the heated blast," should be deleted. Column 5, Lines 1 and 2, "the central area of the film then will be shrunk so as to make a tighter and hence better seal." should be deleted. Column 6, Line 60, "position" should read --positioned--.

SIGNED AND SEALED
SEP 15 1970

(SEAL)
Attest:

Edward M. Fletcher, Jr.
Attesting Officer

WILLIAM E. SCHUYLER, JR.
Commissioner of Patents